(12) United States Patent
Takaki et al.

(10) Patent No.: US 7,987,475 B2
(45) Date of Patent: Jul. 26, 2011

(54) CHUCKING MECHANISM, BRUSHLESS MOTOR AND DISK DRIVE APPARATUS

(75) Inventors: Hitoshi Takaki, Kyoto (JP); Yusuke Iwai, Kyoto (JP)

(73) Assignee: Nidec Corporation, Kyoto (JP)

( * ) Notice: Subject to any disclaimer, the term of this patent is extended or adjusted under 35 U.S.C. 154(b) by 847 days.

(21) Appl. No.: 11/941,448

(22) Filed: Nov. 16, 2007

(65) Prior Publication Data

US 2008/0120633 A1      May 22, 2008

(30) Foreign Application Priority Data

Nov. 16, 2006  (JP) .................................. 2006-310608

(51) Int. Cl.
*G11B 17/028* (2006.01)
(52) U.S. Cl. ........................ 720/709; 720/696; 720/715
(58) Field of Classification Search .......... 720/695–717, 720/721–724
See application file for complete search history.

(56) References Cited

U.S. PATENT DOCUMENTS

| | | | |
|---|---|---|---|
| 6,611,490 B1 * | 8/2003 | Bierhoff | 720/707 |
| 6,832,384 B2 | 12/2004 | Yamaguchi | |
| 6,868,549 B2 * | 3/2005 | Watanabe et al. | 720/715 |
| 7,900,223 B2 | 3/2011 | Takaki et al. | |
| 2003/0107984 A1 | 6/2003 | Yamaguchi | |
| 2007/0157219 A1 | 7/2007 | Oota | |
| 2007/0192779 A1 | 8/2007 | Oota | |
| 2007/0192780 A1 | 8/2007 | Oota | |
| 2007/0199008 A1 | 8/2007 | Oota | |
| 2008/0235717 A1 | 9/2008 | Takaki et al. | |
| 2008/0235718 A1 | 9/2008 | Takaki et al. | |
| 2008/0235720 A1 | 9/2008 | Takaki et al. | |

FOREIGN PATENT DOCUMENTS

| | | |
|---|---|---|
| CN | 1412758 A | 4/2003 |
| JP | 2002-190149 A | 7/2002 |
| JP | 2005-251298 A | 9/2005 |
| JP | 2005-251299 A | 9/2005 |
| JP | 2005-251300 A | 9/2005 |
| JP | 2005-251301 A | 9/2005 |
| JP | 2005-251302 A | 9/2005 |
| JP | 2005-251303 A | 9/2005 |
| JP | 2005-251304 A | 9/2005 |
| JP | 2005-251305 A | 9/2005 |
| JP | 2005-251306 A | 9/2005 |
| JP | 2006-48821 A | 2/2006 |
| KR | 1020050095085 A | 9/2005 |
| WO | WO 2005086152 A1 * | 9/2005 |

OTHER PUBLICATIONS

Chinese Office Action dated Aug. 21, 2009, issued in Chinese Patent Application No. 200810087511.6.
U.S. Appl. No. 12/051,279, Takaki et al., dated Mar. 19, 2008.
U.S. Appl. No. 12/051,327, Takaki et al., dated Mar. 19, 2008.
U.S. Appl. No. 12/051,313, Takaki et al., dated Mar. 19, 2008.
U.S. Appl. No. 12/051,285, Takaki et al., dated Mar. 19, 2008.

* cited by examiner

*Primary Examiner* — Wayne R Young
*Assistant Examiner* — Nathan A Danielsen
(74) *Attorney, Agent, or Firm* — Westerman, Hattori, Daniels & Adrian, LLP

(57) ABSTRACT

A chucking mechanism according to the present invention includes a claw member which retains a discoid disk and is arranged between a plurality of claw portions which put a radial force outwardly to a central opening portion of the disk and a plurality of claw portions, a receiving portion and a sliding portion.

17 Claims, 12 Drawing Sheets

CHUCKING MECHANISM, BRUSHLESS MOTOR AND DISK DRIVE APPARATUS

BACKGROUND OF THE INVENTION

1. Field of the Invention

The present invention relates to a chucking mechanism which detachably retains a central opening portion of a storage medium which rotates along a predetermined axis, a brushless motor and a disk drive apparatus.

2. Description of the Related Art

A chucking mechanism which detachably retains a data storage medium (hereinafter referred to as disk) includes a plurality of claw members at a turn table thereof. The claw members which are movable in a substantially radial direction make contact with a central opening portion of the disk so as to securely and detachably retain the disk. In order to achieve an optimal strength for retaining the disk and allow the disk to be removed smoothly, it is important that the chucking mechanism includes appropriate components having appropriate functions.

Conventionally, each claw member includes at a circumferentially central area of a tip portion thereof one claw portion for retaining the central opening portion of the disk.

Having only one claw portion per claw member may damage (e.g., deformation) the disk since a radial force of each claw portion may be slightly different from one another. Also, since each claw member may apply the radial force different from one another to the disk, an alignment between the rotation of the disk and a central axis of the brushless motor will be compromised.

Also, since a contact area, per claw member, making contact with the disk is limited and small, a force generated by the chucking mechanism to retain the disk is limited.

SUMMARY OF THE INVENTION

In order to overcome the problems described above, preferred embodiments of the present invention provide a chucking mechanism according to the present invention preferably includes a claw member which retains a discoid disk which rotates about a predetermined central axis, an elastic member which provides radial force for the claw member, and a receiving portion which makes contact with the claw member in a sliding manner. The claw member includes a plurality of claw portions, and a sliding portion. When the disk is set on the chucking mechanism according to the preferred embodiment of the present invention, the claw member moves, due to the contact between the claw member and the sliding portion, inwardly in a radial direction. The claw member also includes an arched tip portion.

Other features, elements, steps, characteristics and advantages of the present invention will become more apparent from the following detailed descriptions of preferred embodiments thereof with reference to the attached drawings.

DETAILED DESCRIPTION OF PREFERRED EMBODIMENT

Structure of Brushless Motor

Figure 1:
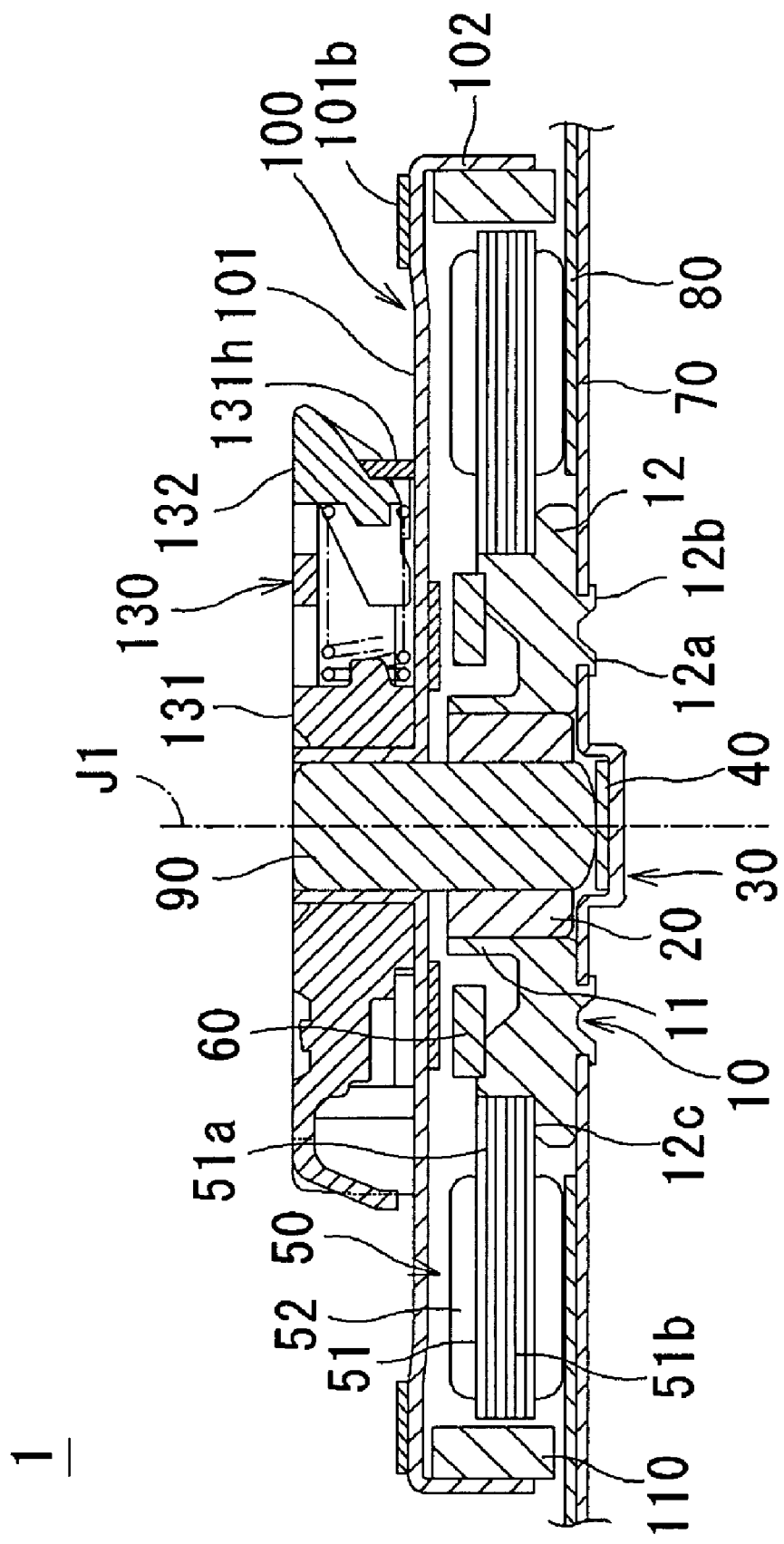
FIG. 1 is a schematic cross sectional view of a brushless motor according to a preferred embodiment of the present invention.

Note that in the description of preferred embodiments of the present invention herein, words such as upper, lower, left, right, upward, downward, top and bottom for describing positional relationships between respective members and directions merely indication positional relationships and directions in the drawings. Such words do not indicate positional relationships and directions of the member mounted in an actual device. Also note that reference numerals, figure numbers and supplementary descriptions are shown below for assisting the reader in finding corresponding components in the description of the preferred embodiments below to facilitate the understanding of the present invention. It is understood that these expressions in no way restrict the scope of the present invention.

Hereinafter, a brushless motor incorporated with a chucking mechanism according to a first preferred embodiment of the present invention will be described with reference to FIG. 1. FIG. 1 is a schematic cross sectional view of a brushless motor 1 according to the present preferred embodiment of the present invention.

Hereafter, a stator portion of the brushless motor 1 will be described.

A housing 10 preferably having a substantially cylindrical shape concentric with a central axis J1 is preferably made by a deformation process such as cutting performed on a copper base material. A sleeve 20 is affixed to an inner circumferential surface of a cylindrical portion 11 of the housing 10. The sleeve 20 preferably having a substantially cylindrical shape is a sintered member impregnated with oil.

The housing 10 preferably includes at a portion axially below the cylindrical portion 11 a stator base portion 12 preferably having a substantially cylindrical shape extending in a radially outward direction, wherein the cylindrical portion 11 is formed preferably integrally with the stator base portion 12. The stator base portion 12 preferably includes at a bottom surface thereof a protrusion extending radially inward and a protrusion extending radially outward (hereinafter, referred to as inner circumferential protrusion 12a and outer circumferential protrusion 12b). A plate 30 is arranged at a bottom end surface of the housing 10 so as to cover, from a bottom side, the cylindrical portion 11 and the sleeve 20. The plate 30 is arranged extending inwardly from the inner circumference protrusion 12a. The plate 30 and the inner circumference protrusion 12a are affixed to one another by calking or the like. A thrust plate 40 preferably having a substantially disk shape preferably made of a material excellent in abrasion resistance quality is arranged axially above the plate 30.

The housing 10 preferably includes at an outer circumferential portion of the stator base portion 12 a stator setting portion 12c for setting thereon a stator 50 (described below). The stator 50 preferably includes a stator core 51 having a core back portion 51a of a substantially annular shape, a plurality of tooth portions 51b each extending radially outwardly of the core back portion 51a, and a plurality of coils 52 each formed by winding a plurality of times a conductive wire around each tooth portion 51b.

The housing 10 preferably includes at a portion radially inward of the stator 50 of the stator base portion 12 a pressure magnet 60 having a substantially annular shape. An upper surface of the pressure magnet 60 is arranged axially opposite from a bottom surface of a lid portion 101 of a rotor holder 100 which will be described below.

An attachment board 70 is affixed by calking or the like to the housing 10 at and radially outward of an outer circumferential surface of the outer circumferential protrusion 12b. A circuit board 80 which controls the rotation of the brushless motor 1 is arranged at an upper surface of the attachment board 70 radially outward of the housing 10. As described above, the attachment board 70 and the circuit board 80 cover the stator 50 from the axially lower side thereof.

Hereafter, a rotor portion of the brushless motor 1 will be described.

A shaft 90 is inserted in the axial direction through a through hole of the sleeve 20 in a concentric manner with the central axis J1. The shaft 90 is rotatably supported by an inner circumferential surface of the sleeve 20. The shaft 90 is rotatably supported by a top surface of the thrust plate 40.

The rotor holder 100 is arranged at an upper portion of the shaft 90. The rotor holder 100 preferably covers the stator 50 from an upper side thereof and includes the cylindrical portion 102 covering the stator 50 from radially outside thereof. Also, the rotor holder 100 is formed by laminating a plurality of thin magnetic steel plates.

A rotor magnet 110 is arranged at the inner circumferential surface of the cylindrical portion 102. The inner circumferential surface of the rotor magnet 110 is arranged opposite from an outer circumferential surface of the tooth portions 51b via a radial gap therebetween.

A center case 131 of a chucking mechanism 130 (described below) which is operable to detachably set thereon a disk (not shown in FIG. 1) is arranged at the top surface of the lid portion 101 of the rotor holder 100. A disk mounting portion 101b on which the disk will be set is arranged at an outer circumferential end of the lid portion 101. According to the present preferred embodiment, the rotor holder 100 functions as a turn table.

Chucking Mechanism

Figure 2:
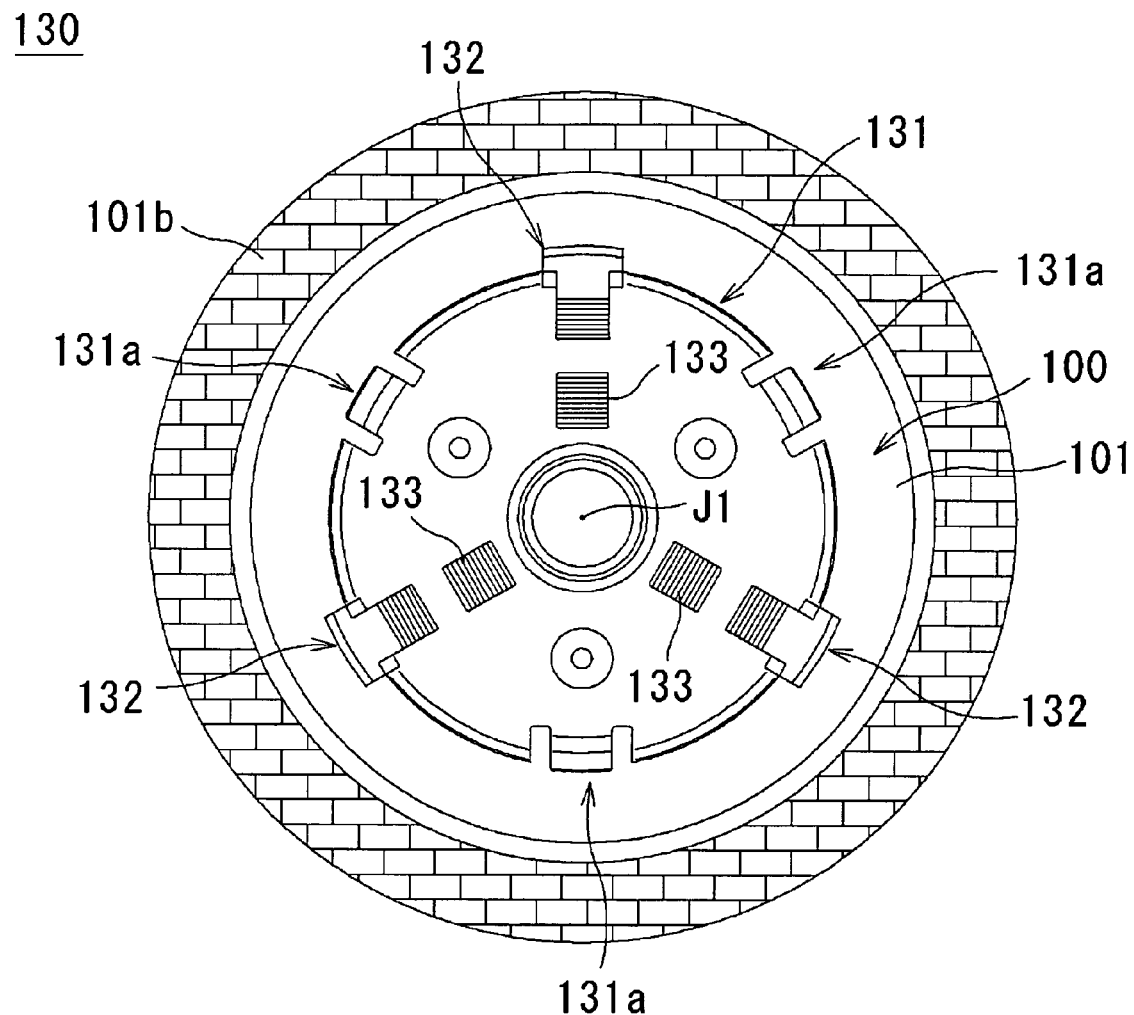
FIG. 2 is a plan view of a chucking mechanism according to the preferred embodiment of the present invention.
Figure 3A:
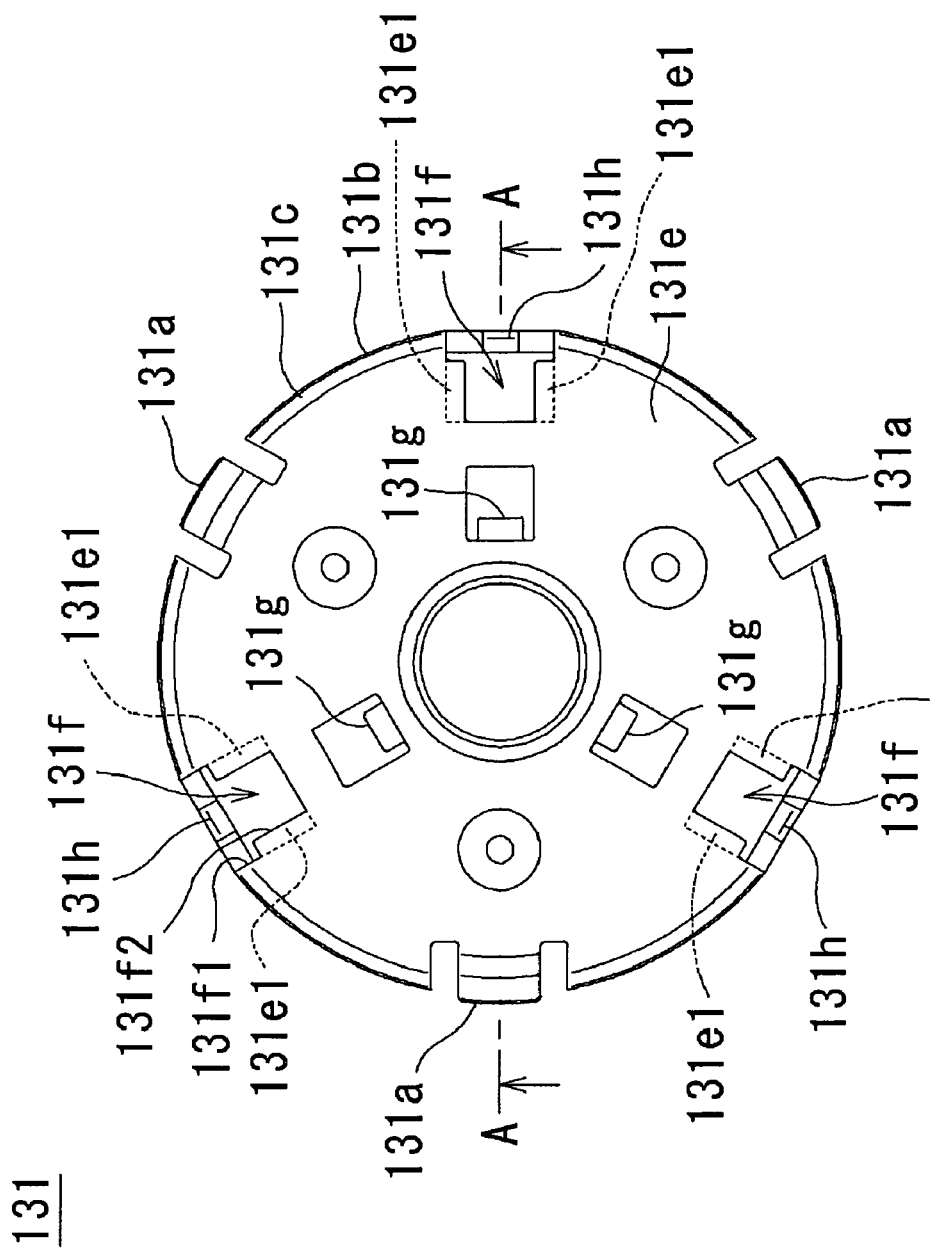
FIG. 3a is a plan view of a center case according to the preferred embodiment of the present invention.
Figure 3B:
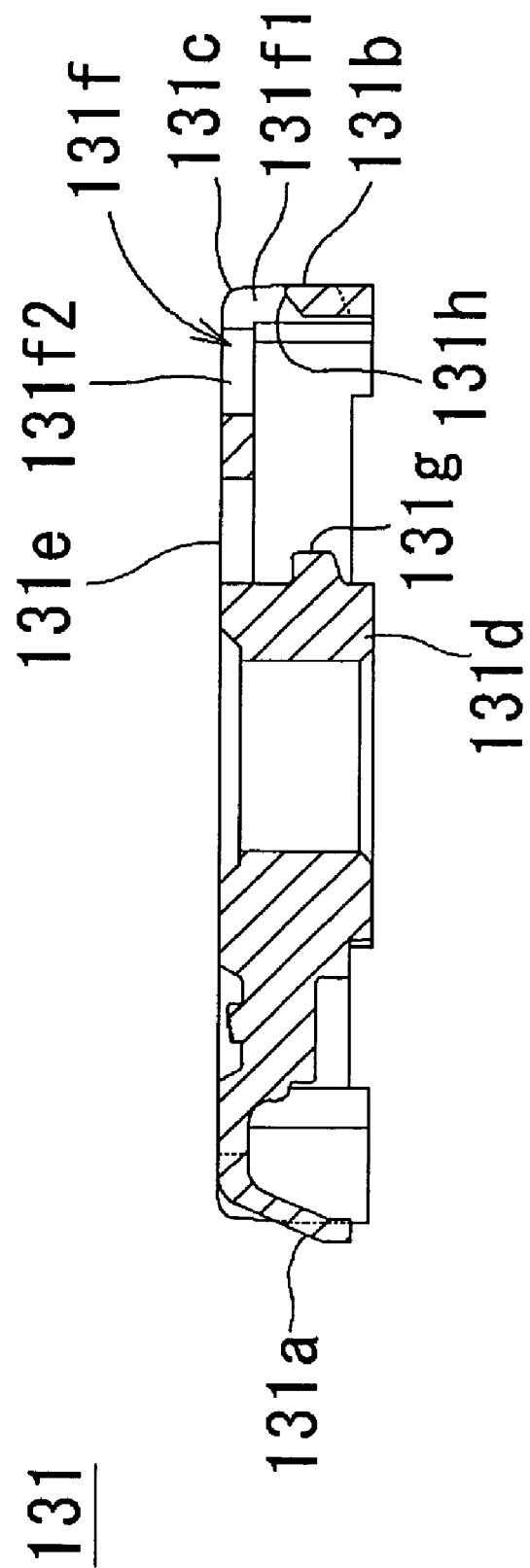
FIG. 3b is a schematic cross sectional view of the center case according to the preferred embodiment of the present invention.
Figure 4A:
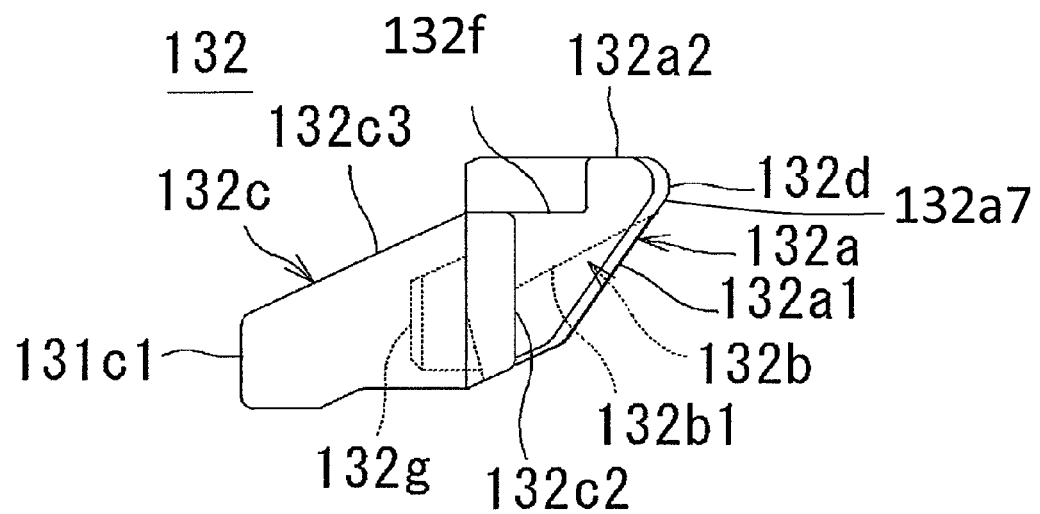
FIG. 4a is a side view of a claw member according to the preferred embodiment of the present invention.
Figure 4B:
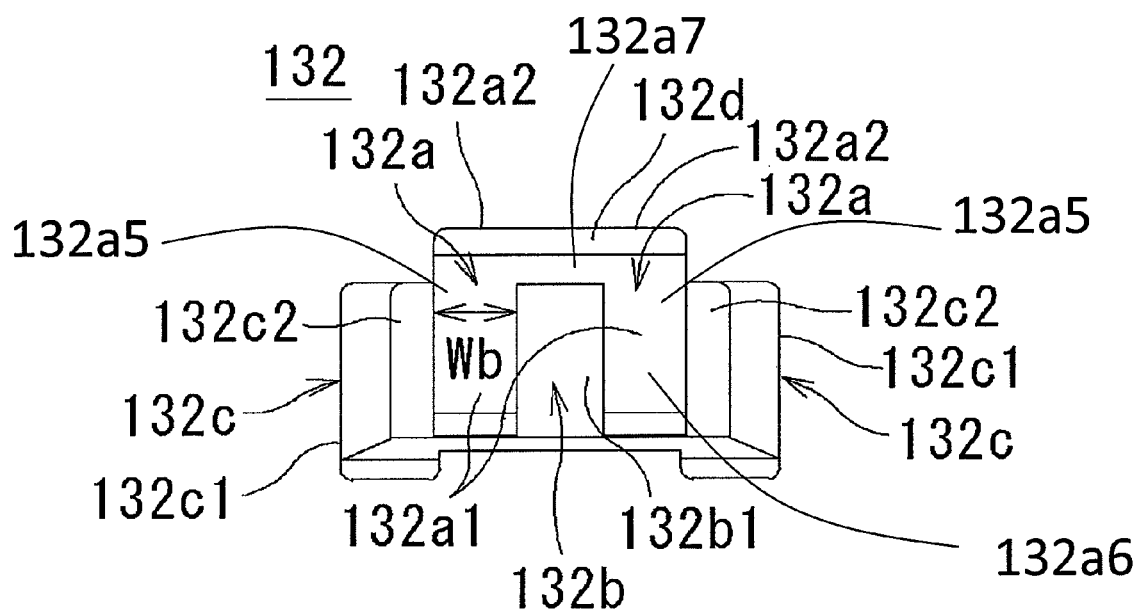
FIG. 4b is a frontal view of the claw member according to the preferred embodiment of the present invention.
Figure 4C:
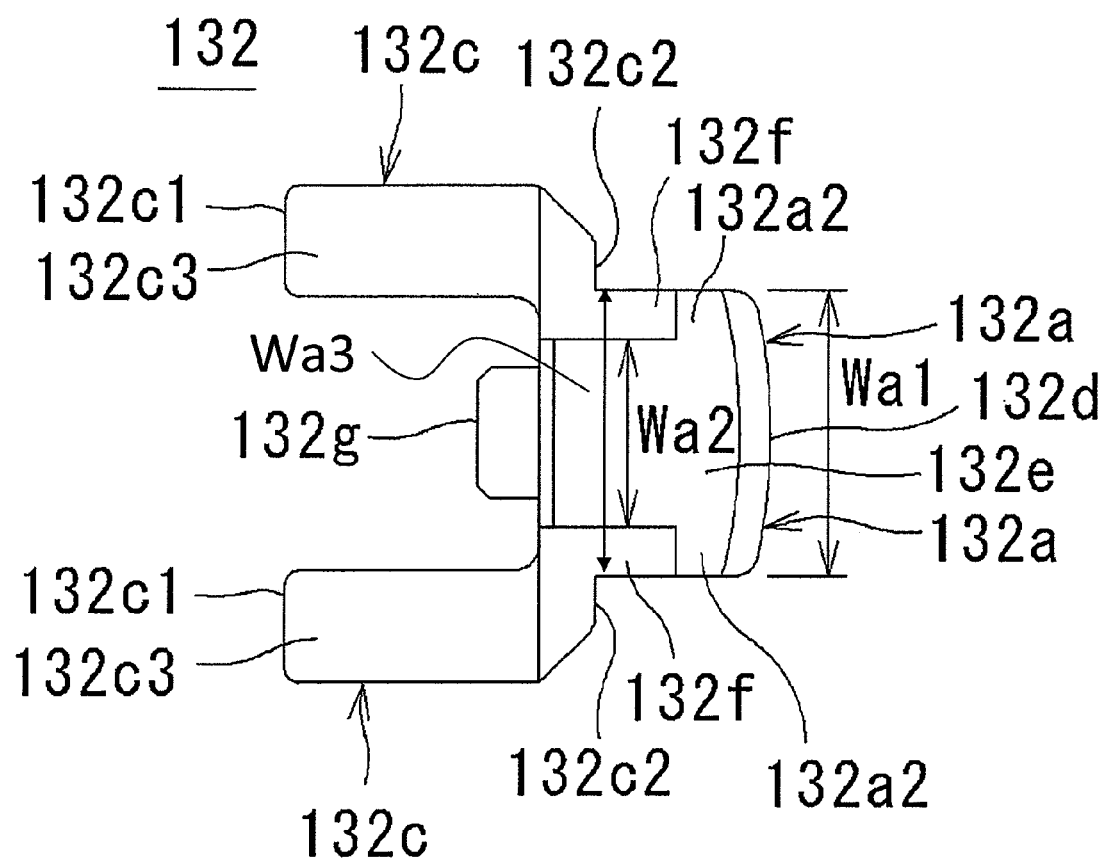
FIG. 4c is a plan view of the claw member according to the preferred embodiment of the present invention.
Figure 5:
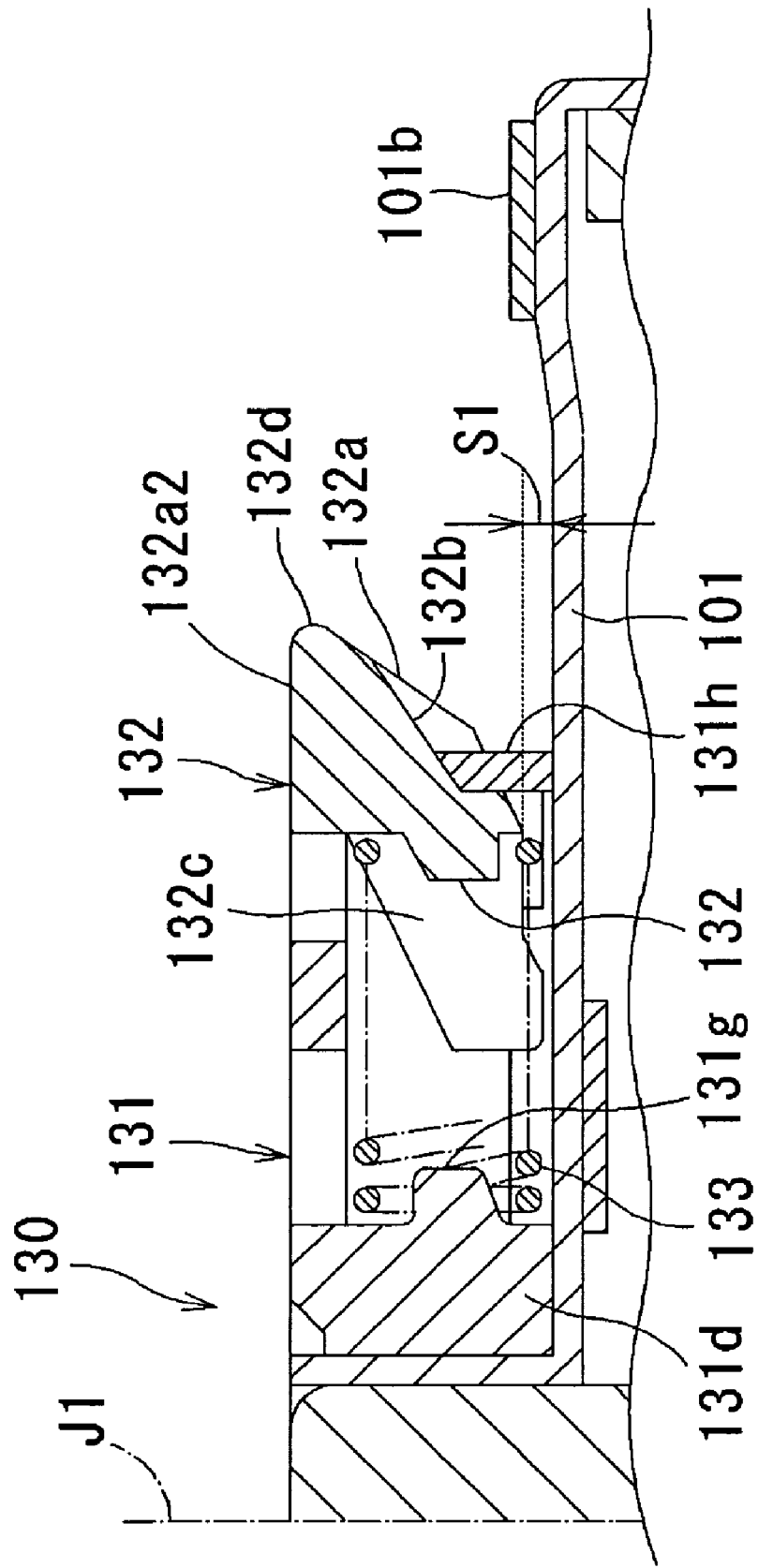
FIG. 5 is a schematic cross sectional view of the chucking mechanism prior to when a disk is arranged thereon.
Figure 6:
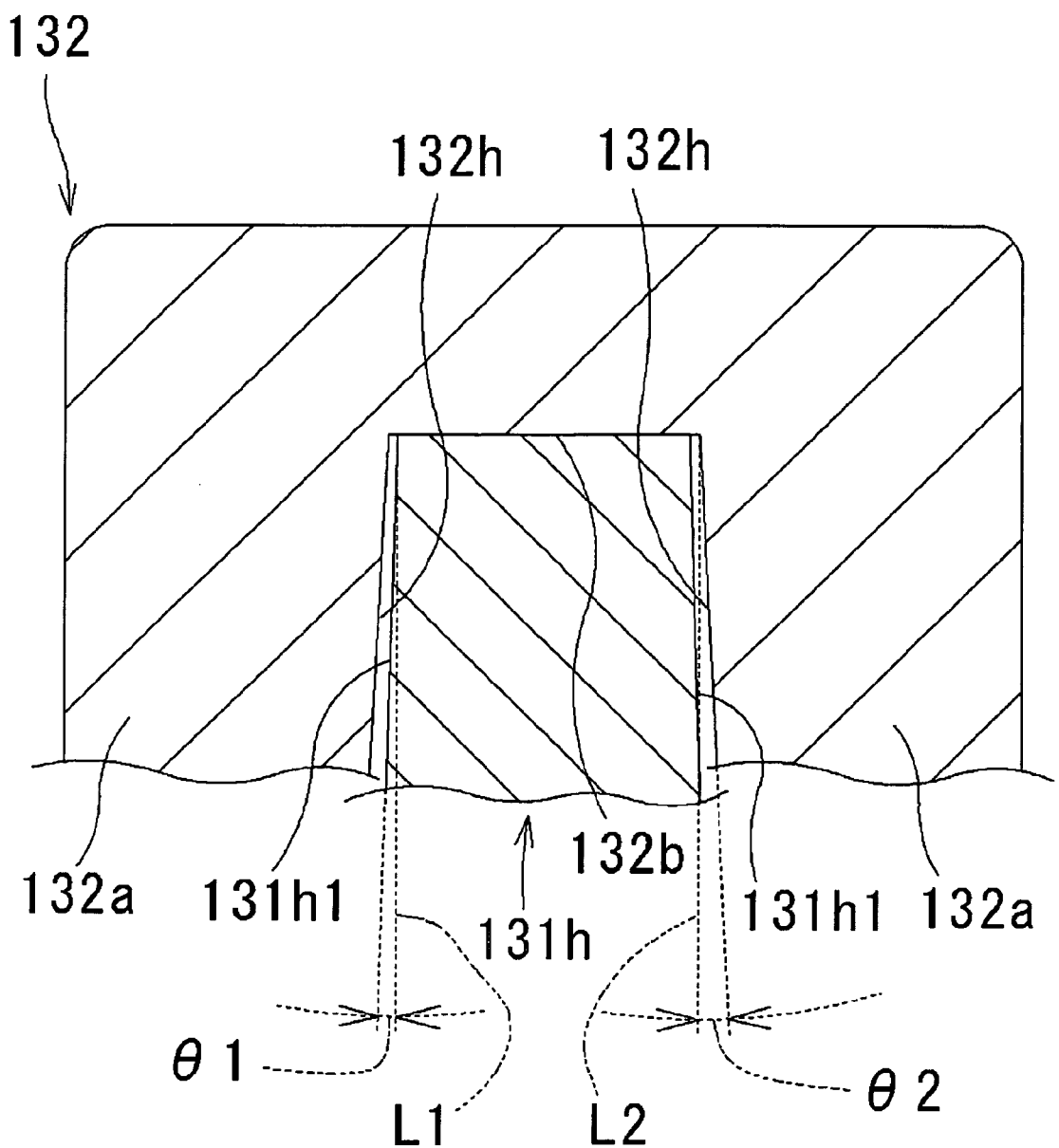
FIG. 6 is a schematic cross sectional view in a circumferential direction of a receiving portion and the claw member according to the preferred embodiment of the present invention.

Hereinafter, the chucking mechanism 130 according to the present preferred embodiment of the present invention will be described with reference to FIGS. 2 to 5. FIG. 2 is a plan view of the chucking mechanism 130 according to the present preferred embodiment. FIG. 3a is a plan view of the center case 131; and FIG. 3b is a cross sectional view of the center case 131 as seen from a line A-A shown in FIG. 3a. FIG. 4a is a side view of a claw member 132 according to the present preferred embodiment; FIG. 4b is a frontal view of the claw member 132; and FIG. 4c is a plan view of the claw member 132. FIG. 5 is a cross sectional view of the chucking mechanism 130 prior to when a disk is arranged thereon according to the present preferred embodiment. FIG. 6 is a cross sectional view of the claw member 132 and a receiving portion 131h as seen in a circumferential direction.

According to FIG. 2, the chucking mechanism 130 preferably includes the center case 131 preferably having a substantially cylindrical shape concentric with the central axis J1, and the rotor holder 100 (i.e., turn table) having the disk mounting portion 101b. The disk mounting portion 101b set on the rotor holder 100 is preferably made of a material excellent in coefficient of friction.

The center case 131 preferably includes at an outer circumference thereof a plurality of alignment claws 131a for aligning a central opening portion of the disk with the central axis J1, and a plurality of claw members 132 arranged so as to contact the inner circumferential surface of the central opening of the central opening portion of the disk. To be more specific, according to the present preferred embodiment, the chucking mechanism 130 preferably includes three alignment claws 131a and three claw members 132 each are alternately arranged in the circumferential direction evenly apart from one another. Also, the center case 131 preferably includes a plurality of elastic members 133 (three according to the present preferred embodiment) which provides radial force for each claw member 132.

According to FIGS. 3a and 3b, the center case 131 preferably includes a cylindrical portion 131b, a guide portion 131c arranged axially above the cylindrical portion 131b for guiding the disk to the cylindrical portion 131b, a base portion 131d for connecting the center case 131 and the rotor holder 100, and a top plate portion 131e connecting the guide portion 131c and the base portion 131d. The base portion 131d preferably includes at an outer circumferential surface thereof facing an opening hole portion 131f a protrusion 131g which protrudes radially outwardly so as to be engaged with the elastic member 133. Note that the protrusion 131g and the base portion 131d are preferably formed integrally.

Also, the center case 131 preferably includes at a portion thereof between the cylindrical portion 131b and the outer circumferential edge of the top plate portion 131e an opening hole portion 131f for each claw member 132. An opening space of the opening hole portion 131f is arranged at the cylindrical portion 131b and the guide portion 131c. Also, each opening hole portion 131f preferably includes at a radially outward portion thereof a wide width portion 131f1 at which point the opening hole portion 131f is wide circumferentially. Note that the circumferential width of the wide width portion 131f1 is preferably greater than that defined by a pair of claw portions 132a (described below), and smaller than that generated by a pair of stopper portions 132c (described below).

Also, the center case 131 preferably includes at a portion of the cylindrical portion 131b lower than each opening hole portion 131f axially corresponding to the claw member 132 a plurality of the receiving portion 131h. The receiving portion 131h is arranged so as to make, upon a contact between the central opening portion of the disk and the claw member 132, contact with a sliding portion 132b of the claw member 132 and to direct the claw member 132 in a radially inward direction.

Since the wide width portion 131f1 is arranged at the radially outward portion of the opening hole portion 131f, an upper side contact portion 132f (described below) of the claw member 132 can be arranged radially inwardly of the claw portion 132a. By virtue of such configuration, the degree of design freedom for the top plate portion 131e of the center case 131 is substantially increased, and therefore, a desirable durability for the top plate portion 131e is achieved. Further, in order to facilitate the radial movement of the claw member 132, the sliding surface 132b1 of the sliding portion 132b needs to make contact with an upper portion of the claw member 132. By virtue of a configuration in which the sliding portion 132b is arranged at the circumferential space between a pair of the upper side contact portions 132f, an axial thickness of the top place portion 131e need not be compromised (e.g., made thinner) ensuring the durability of the top place portion 131e.

According to FIGS. 4A-4C, the claw member 132 preferably includes a plurality (two in the present preferred embodiment) of claw portions 132a, the [[a]] sliding portion 132b which is arranged between the claw portions 132a and forces the claw member 132 to slide with the receiving portion 131h, and a pair of stopper portions 132c per claw member 132 which minimizes a radial movement of the claw member 132.

The claw portions 132a are arranged on both circumferential sides of the claw member 132. Each claw portion 132a preferably includes a pair of disk retaining surfaces 132a1 which make contact with an upper end of the central opening portion of the disk and retain the disk. The disk retaining surface 132a1 preferably includes an inclined surface such that the axially upper a portion thereof is the radially outerward the portion is. The claw portion 132a preferably includes at a portion at which the top surface 132a2 and the disk retaining surface 132a1 meet a tip portion 132d which is a rounded protrusion in a radially outward direction. Mirror polishing which allows the disk to travel smoothly to the disk retaining surface 132a1 from the top surface 132a2 of the claw portion 132a is applied on the top surface 132a2 and the disk retaining surface 132a1. By virtue of such configuration, the disk can be set on and detached from the chucking mechanism 130.

Also, in order to increase a retaining force (i.e., force to retain the disk) of the chucking mechanism 130 to retain the disk, the tip portion 132d includes a substantially arced end (see FIG. 4c). Note that the tip portion 132d will be arranged axially above a sliding portion 132b (described below).

By virtue of such configuration, the retaining force conducted to the disk from the claw portion 132a is evenly distributed and thereby minimizing deformation which may be caused to the disk from the contact between the claw portion 132a and the disk, and improving the alignment between the rotation of the disk and the central axis J1.

Also, since the claw member 132 includes the claw portion 132a, an area of contact between the disk and the claw member 132 will be enlarged improving the retaining force.

Also, by virtue of the configuration in which the tip portion 132d includes the arced end extending from one circumferential end thereof to the other circumferential end thereof and making a large contact area between the claw member 132 and the disk, when the disk includes a plurality of disks pasted to one another in the axial direction, the tip portion 132d is less likely to be stuck between the disks (i.e., referred to as chucking failure).

The sliding surface 132b1 which is arranged between the pair of the disk retaining surfaces 132a1 includes a portion arranged axially below the top surface 132a2 of the claw portion 132a and axially above the disk retaining surface 132a1. By virtue of such configuration, the sliding portion 132b is substantially indented in the axially upward direction with respect to the claw portion 132a. Also, the sliding surface 132b1 includes a surface inclined such that the axially upper a portion thereof is the radially outerward the portion is. The sliding surface 132b1 slidingly contacts with the receiving portion 131h so as to force the claw member 132 in the radially inward direction. Note that the mirror polishing is applied on the sliding surface 132b1.

A circumferential width Wa1 at a top surface 132e (see FIG. 4c) of the tip portion 132d is subsequently equal to a circumferential width defined by the pair of the claw portions 132a. A circumferential width Wa2 at a portion of the top surface 132e radially more inward than the tip portion 132d is smaller than Wa1. Therefore, the claw member 132 preferably includes the upper side contact portion 132f for each downward facing contact surface 131e1 of the top plate portion 132e of the center case 131.

By virtue of the configuration in which Wa1 is greater than Wa2, that is, the central opening portion of the disk is allowed to make contact with a large contact area of the claw member 132, the retaining force of the chucking mechanism 130 will be improved.

A protrusion 132g which protrudes radially inwardly so as to engage with the elastic member 133 is arranged at a radially inner side surface of the claw portion 132a and the sliding portion 132b.

The claw member 132 preferably includes at a portion thereof between each stopper portion 132c and the claw portion 132a a bulged portion 132c1. A circumferential distance between the pair of bulged portions 132c1 (i.e., a distance between an inner circumferential surface of each bulged portion 132c1 facing each other) is greater than the circumferential width of the claw portion 132a. As described in FIG. 4B, the claw member 132 has a first claw portion 132a5 having a first claw surface 132a6 located at an inward and axially downward portion of the tip portion 132d. As described at FIGS. 4A to 4B, the claw member has a sliding portion 132b having a sliding surface 132b1 between the first claw portions 132a5, 132a5. As described in FIG. 4A, the sliding surface is axially higher than the first claw portions. As described in FIGS. 4A and 4B, the claw member has a second claw portion 132a7 between the tip portion 132d and the sliding portion 132b.

The stopper portion 132c includes at a radially outward facing surface thereof a movement restriction surface 132c2 which makes contact with the inner circumferential surface of the cylindrical portion 131b so as to minimize a radial movement of the claw member 132. Also, the bulged portion 132c1 preferably includes at a top surface thereof an inclined surface 132c3 inclined such that a radially innerward a portion thereof is the axially lower the portion is.

Hereafter, the chucking mechanism 130 prior to when the disk is set thereon will be described with reference to FIG. 5.

The elastic member 133 is arranged at a radial space between the center case 131 and the claw member 132 so as to provide the radial force to the claw member 132. According to the present preferred embodiment of the present invention, the elastic member 133 is a coiled spring and is arranged at a circumferential space between the pair of the bulged portions 132c1. The elastic member 133 is, at a radially outmost portion thereof, engaged with the protrusion 132g and makes contact with the radially inner side surface of the sliding portion 132b and that of the claw portion 132a. The elastic member 133 is, at a radially innermost portion thereof, engaged with the protrusion 131g of the base portion 131d and makes contact with the base portion 131d.

The claw member 132 which is pushed in the radially outward direction by the elastic member 133 is prevented from moving in the radially outward direction excessively when the movement restriction surface 132c2 of the stopper portion 132c makes contact with the inner circumferential surface of the cylindrical portion 131b.

According to FIG. 6, a pair of circumferential surfaces (hereafter, each referred to as side surface 131h1) of the receiving portion 131h are inclined such that a distance between the pair becomes narrower toward an upper portion thereof in the axial direction. A pair of circumferential surfaces (hereafter, each referred to as wall surface 132h) of the claw portion 132a each arranged opposite from the side surface 131h1 are inclined such that a distance between the surfaces becomes narrower toward an upper portion thereof in the axial direction.

The claw member 132 and the receiving portion 131h are made of a resin material by an injection molding. As shown in FIG. 6, θ2 which is an angle defined by the wall surface 132h and a line L2 connecting in the radial direction the central axis J1 and a top end portion of the wall surface 132h is greater than θ1 which is an angle defined by the side surface 131h1 and a line L1 connecting in the radial direction the central axis J2 and the side surface 131h1 of the receiving portion 131h. Note that the angle defined by the receiving portion 131h and the side surface 131h1, and the angle defined by the claw member 132 and the wall surface 132h are determined by an inclination of the mold used to form the claw member 132 and the receiving portion 131h.

By virtue of such configuration in which a gap between the wall surface 132h and the side surface 131h1 which are opposite to one another becomes narrower toward the axially upper portion, a large circumferential width Wb (see FIG. 4b) of the contact area between the claw portion 132a and the disk will be arranged, and therefore, the retaining force of the chucking mechanism 130 will be improved.

Also, according to FIG. 5, the top surface 132a2 arranged at the circumferential space between the pair of the upper side contact portion 132f is preferably arranged axially above a bottom surface of the top plate portion 131e, and includes in the circumferential direction the sliding portion 132b. By virtue of such configuration, the chucking mechanism 130 will achieve a desirable size and dimension in the axial direction. Also, the sliding portion 132b can be arranged at an upper portion of the claw member 132, and thereby allowing the claw member 132 to move in the radially inward direction with facility. Also, since the receiving portion 131h may freely be designed to have a desirable axial height, an axial distance between the tip portion 132d when moving in the radially inward direction and the disk mounting portion 101b may freely be designed. Also, the top surface 132a2 includes a flat surface having an identical axial height in the radial direction and in the circumferential direction. Also, since the top surface 132a2 is connected to the tip portion 132d, the claw member 132 may be designed having a desirable axial thickness.

Also, since the side surfaces 131h1 are inclined such that the distance between the pair becomes narrower toward the upper portion thereof in the axial direction, the receiving portion 131h will be arranged at the circumferential space between the claw portions 132a. By virtue of such configuration, when the sliding portion 132b slidingly makes contact with the receiving portion 131h, a gap between the side surface 131h1 and the wall surface 132h will be kept at minimum, and therefore, the claw member 132 will be substantially restricted from moving in the circumferential direction which stabilizes the radial movement of the claw member 132.

Radial Movement of Claw Member

Figure 7:
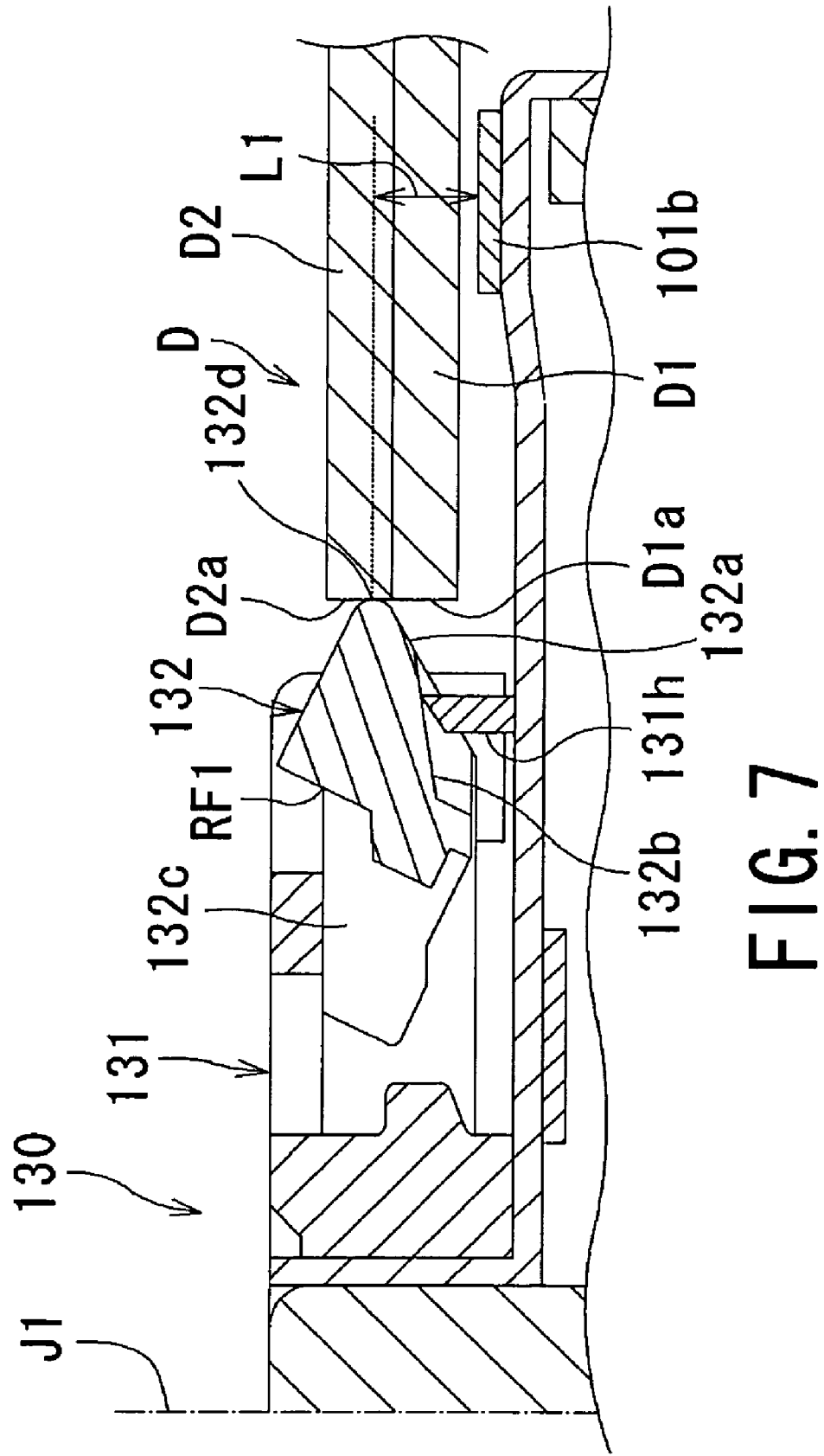
FIG. 7 is a schematic cross sectional view of the claw member when the same is moved in a radially inward direction.
Figure 8:
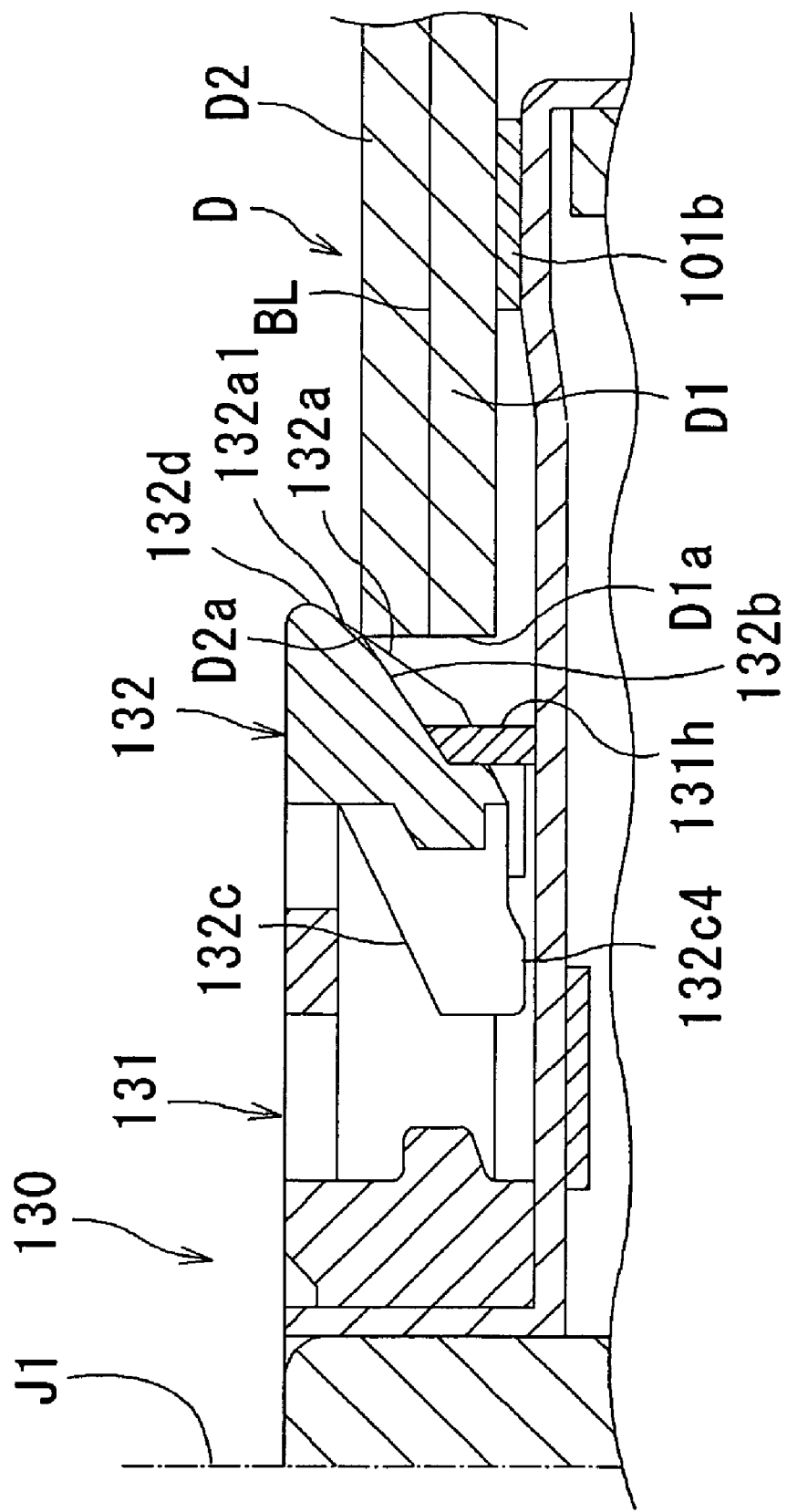
FIG. 8 is a schematic cross sectional view in an axial direction of the chucking mechanism when the disk is retained thereby.

Next, a radial movement of the claw member 132 will be described with reference to FIG. 7 and FIG. 8. FIGS. 7 and 8 each show, similarly as FIG. 5, a schematic cross sectional view of the chucking mechanism 130. To be more specific, FIG. 7 shows the chucking mechanism 130 when a disk D begins to make contact with the tip portion 132d of the claw member 132, and FIG. 8 shows the chucking mechanism 130 with the disk D set thereon wherein the disk D is a multi-layered disk including, according to the present preferred embodiment, two disk pasted to one another.

When the disk D makes contact with the top surface 132a2 of the claw portion 132a, the tip portion 132d is pushed in the axially downward direction, then the receiving portion 131h slides over the sliding portion 132b. By virtue of such configuration, the claw member 132 moves such that the tip portion 132d moves in the axially downward direction while the entire claw member 132 moves in the radially inward direction.

Note that the disk D according to the preset preferred embodiment includes a lower disk base D1 which is pasted by adhesive to an upper disk base D2. Note that each disk includes a central opening portion, D1a and D2a, respectively.

A position of a lower fulcrum RF1 at which the tip portion 132d of the claw member 132 moves in the axially downward direction when the disk D makes contact with the top surface 132a2 of the claw member 132 will be determined in accordance with a position at which the upper side contact portion 132f of the claw member 132 makes contact with the bottom surface of the top plate portion 131e of the center case 131. The lower fulcrum RF1 moves along the bottom surface of the top plate portion 131e in accordance with the axial position of the disk D.

Also, as shown in FIG. 7, the lower fulcrum RF1 is at a radially innermost position when the central opening portion D2a of the upper disk base D2 makes contact with the tip portion 132d of the claw member 132 (i.e., when the claw member 132 is at a radially innermost position). Also at this point, the tip portion 132d is at an axially lowest point. Note that the axial distance between the tip portion 132d and the top surface of the disk mounting portion 101b, when the tip portion 132d is at the axially lowest point, will be referred to as L1.

Note that L1 is greater than an axial distance between the disk mounting portion 101b and a portion of the disk D at which the lower disk base D1 and the upper disk base D2 are pasted to one another (hereafter, referred to as border portion BL). By virtue of such configuration, the axial movement of the tip portion 132d is preferably executed above, in the axial direction, the border portion BL of the disk D set on the disk mounting portion 101b. It is to be appreciated that the axial movement of the tip portion 132d is, more preferably, executed above, in the axial direction, a bottom surface of the upper disk base D2 of the disk D.

Also, when the tip portion 132d is positioned at a point as shown in FIG. 7, the tip portion 132d begins to slide, due to the receiving portion 131h and the sliding portion 132b, toward the inner circumferential surface of the central opening portion D2a and the central opening portion D2a of the disk D. By virtue of such configuration, the axial position of the sliding portion 132b will be restricted by the receiving portion 131h via the lower fulcrum RF1, and therefore, the axial position of the tip portion 132d will be restricted.

It is to be noted that the disk D is sometimes held by an edge portion thereof when set on the chucking mechanism 130. When the disk D is held by the edge portion, the central opening portions D1a and D2a may be deformed toward the axial direction generating a gap at the border portion BL. When the disk D, for example, a dual disk which includes a CD (whose axial thickness is 0.6 mm) and a DVD (whose axial thickness is 0.9 mm) is set on the chucking mechanism 130 while the disk D is held by the edge portion, it is preferable that L1, the distance between the disk mounting portion 101b and the axially lowest point of the tip portion 132d, is greater than 1.1 mm, so that the axial movement of the tip portion 132d will be completed above the border portion BL. By virtue of such configuration, the tip portion 132d will not be caught between the disks at the border portion BL (i.e., chucking failure will be minimized).

According to FIG. 8, the disk retaining surface 132a1 makes contact with the central opening portion D2a of the upper disk base D2 since the claw member 132 is pushed in the radially outward direction by the elastic member 133. Then, the claw member 132 retains the disk D. At this point, the upper side contact portion 132f makes contact with the downward facing contact surface 131e1 arranged at the bottom surface of the top plate portion 131e of the center case 131. Then an axially lower side surface 132c4 of the stopper portion 132c makes contact with a top surface of the rotor holder 100. By virtue of such configuration, since the claw member 132 makes contact with the center case 131 and the rotor holder 100, the tip portion 132d of the claw member 132 moves in the radially inward direction but not in the axially upward direction and thereby securely retaining the disk.

Figure 9:
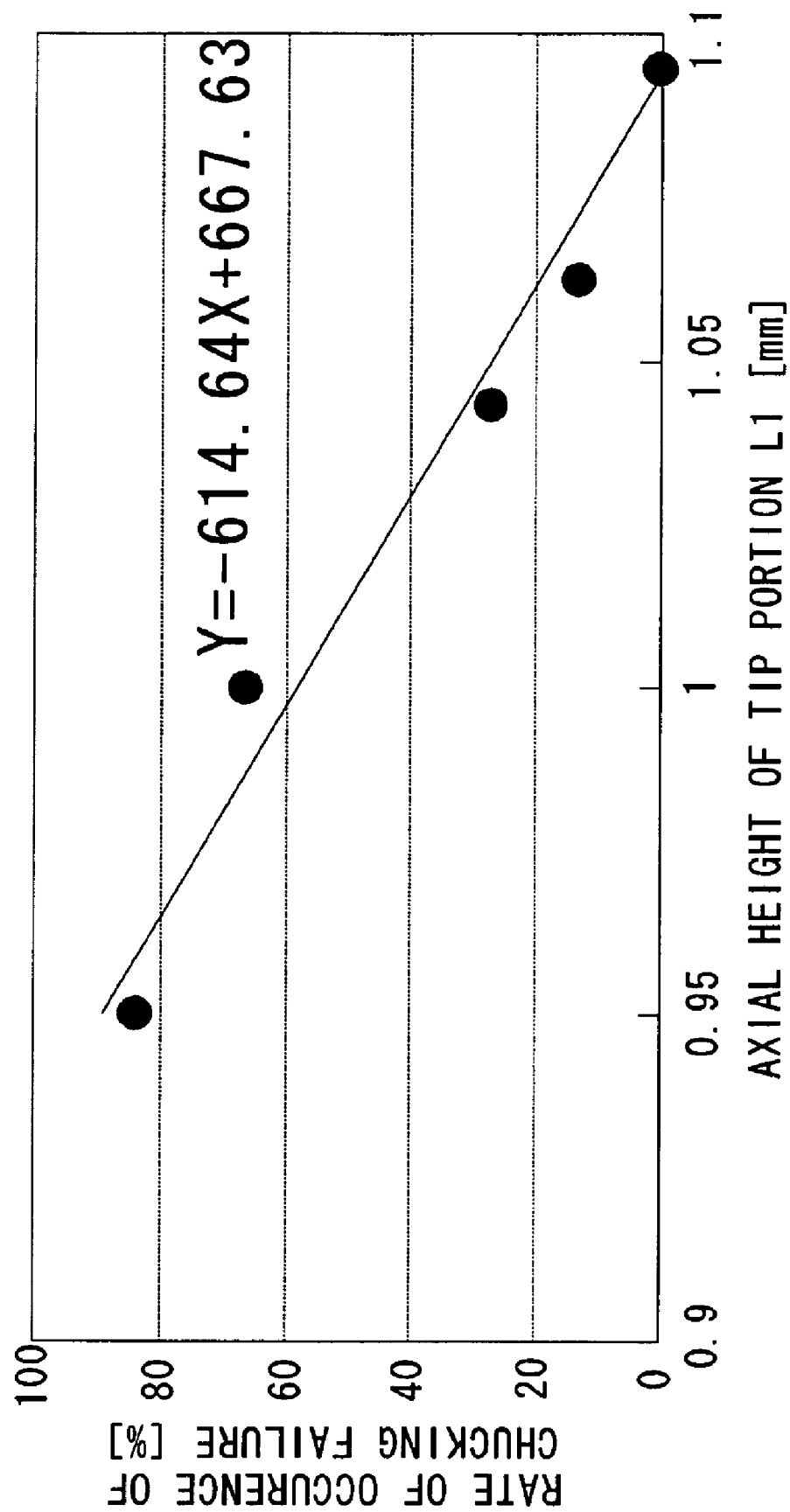
FIG. 9 is a graph indicating a correlation between a rate of occurrence of chucking failure and axial height of a tip portion according to the preferred embodiment of the present invention.

Axial Distance between Tip Portion and Disk Mounting Portion and Its Correlation with Chucking Failure Next, a correlation between the occurrence of chucking failure and L1 will be described with reference to FIG. 9. FIG. 9 is a graph indicating a correlation between a rate of occurrence of chucking failure and axial height of a tip portion according to the preferred embodiment of the present invention. Note that the vertical axis of the graph indicates the frequency (%) of the occurrence of the malfunction of the chucking mechanism 130 and the horizontal axis indicates the value of L1 (mm). Also note that the adhesive may not be applied on the entire surface connecting the CD and DVD.

According to FIG. 9, the greater the value of L1 is, the smaller the frequency of the occurrence of the chucking failure occurs. When such relationship is numerically denoted, it is approximately: $Y=-614.64X+667.63$. That is, when Y is 0, no chucking failure occurs (i.e., when X equals approximately 1.08). Therefore, according to the equation above, the value of L1 at which no chucking failure occurs is approximately 1.1. Thus, it is preferable that the axial distance between the tip portion 132d when at the axially lowest point and the top surface of the disk mounting portion 101b is greater than approximately 1.1 mm. Note that the value of X may differ slightly in accordance with the amount of adhesive used to connect the Dual Disk.

Disk Drive Apparatus

Figure 10:
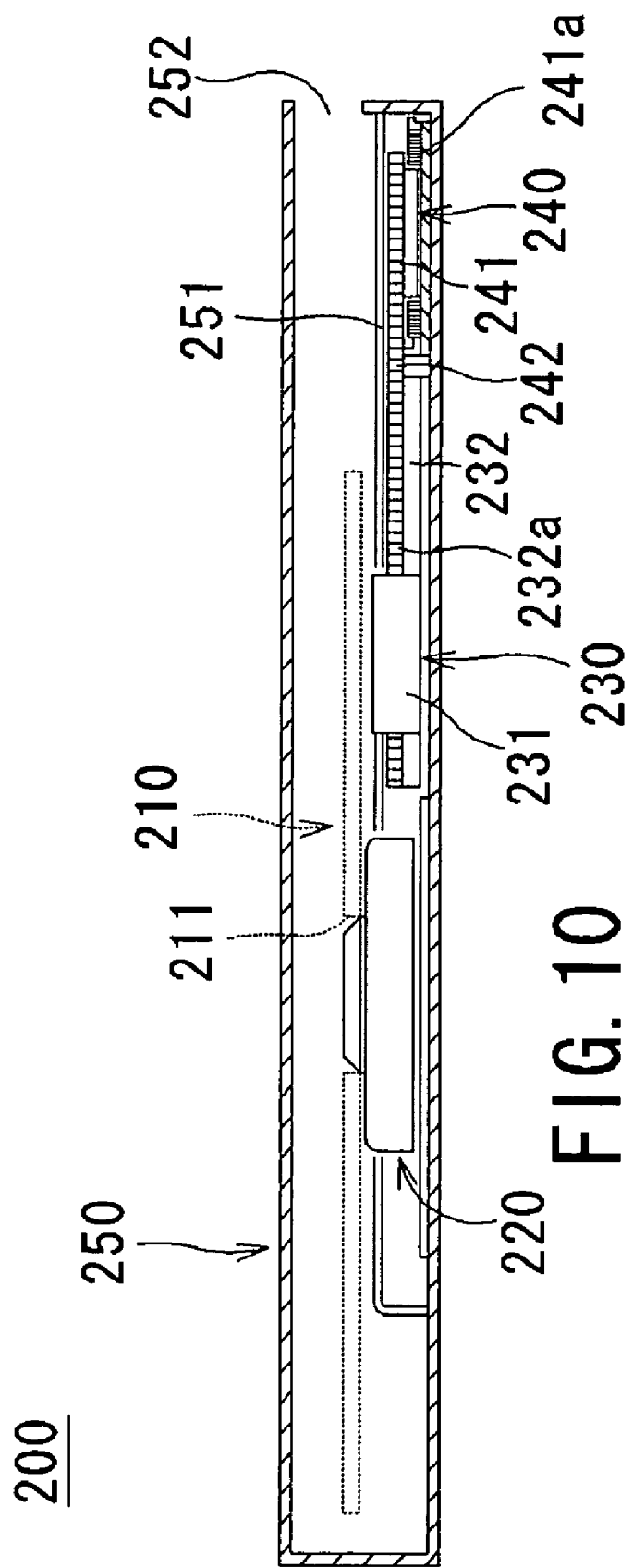
FIG. 10 is a schematic cross sectional view of a disk drive apparatus according to a preferred embodiment of the present invention.

Hereinafter, a disk drive apparatus according to a preferred embodiment of the present invention will be described with reference to FIG. 10. FIG. 10 is a schematic cross sectional view of the disk drive apparatus.

According to FIG. 10, a disk drive apparatus 200 preferably includes a brushless motor 220 a portion of which fits central opening portion 211 of the discoid disk 210 so as to rotate the disk 210 in a concentric manner with the disk drive apparatus 200, an pickup mechanism 230 which emits an optical light at and receives the reflected optical light from the disk 210, a gear mechanism 240 which moves the pickup mechanism 230 in the radial direction with respect to the disk 210, and a housing 250 for accommodating the brushless motor 220, the pickup mechanism 230, and the gear mechanism 240.

The gear mechanism 240 preferably includes a motor 241 and a torque receiving gear 242 which receives a rotary torque generated by the motor 241.

Also, the housing 250 preferably includes a bordering plate 251 preferably made of a thin plate so as to divide the disk 210 and the gear mechanism 240. Also, the housing 250 preferably includes an opening hole portion through which the disk 210 will be inserted and ejected.

The pickup mechanism 230 preferably includes a light emitting and receiving portion 231 which emits and receives an optical light (i.e., laser beam), and a moving portion 232 which is arranged vertically with respect to the radial movement of the light emitting and receiving portion 231 and moves the light emitting and receiving portion 231. The moving portion 232 preferably includes an engaging portion 232a which engages with the torque receiving gear 242. The light emitting and receiving portion 231 is engaged with the moving portion 232 and is thereby allowed to move in the radial direction.

While the present invention has been described in detail, the foregoing description is in all aspects illustrative and not restrictive. It is understood that numerous other modifications and variations can be devised without departing from the scope of the invention.

For example, the disk retaining surface 132a1 and the sliding surface 132b1 may be formed at the same surface.

For example, although the preferred embodiment assumes that the brushless motor according to the present invention has a configuration in which the rotor magnet 110 is arranged radially outward of the stator 50, the present invention is no limited thereto; the tooth portions 51b of the stator 50 may extend toward the central axis J1 wherein an inner circumferential surface of the tooth portion 51b is arranged opposite to the outer circumferential surface of the rotor holder 110. Further, the stator 50 and the rotor magnet 110 may be arranged in the axial direction with respect to one another.

Also, although the preferred embodiment of the present invention assumes that the claw member 132 includes two claw portions 132a between which one sliding portion 132b is arranged, the claw member 132 may includes more than three claw portions 132a. When the claw member 132 includes more than three claw portions 132a, one sliding portion 132b is arranged between a pair of claw portions 132a.

What is claimed is:

1. A chucking mechanism operable to detachably set thereon a discoid disk including a central opening portion, the chucking mechanism comprising:
   a rotor portion including a disk mounting portion concentric with a predetermined central axis and making contact with the disk;
   a plurality of claw members, each arranged to move in a radial direction and make contact with the central opening portion of the disk to retain the disk;
   a plurality of elastic members providing a force in the radial direction to each of the claw members; and
   a plurality of receiving portions arranged axially opposite to each of the claw members to guide each of the claw members inwardly in the radial direction when each of the claw members is pressured from the central opening portion, wherein each of the claw members comprising:
- a tip portion located at an outermost portion of each of the claw members in the radial direction;
- a plurality of first claw portions, each of the first claw portions has a first claw surface located at a first inward and axially downward portion of the tip portion, the first claw surface pressuring the central opening portion of the disk outwardly in the radial direction, and
- a sliding portion having a sliding surface arranged between the first claw portions to make contact with each of the receiving portions, the sliding surface being axially higher than the first claw portions.

2. The chucking mechanism according to claim 1, wherein the tip portion includes a substantially arced shape.

3. The chucking mechanism according to claim 1, wherein the tip portion makes contact with an upper end portion of the central opening portion when the disk is set on the chucking mechanism.

4. The chucking mechanism according to claim 1, wherein
- the first claw portions have a pair of wall surfaces each arranged opposite in a circumferential direction from the sliding portion, each of the wall surfaces being inclined such that a distance therebetween becomes narrower toward an upper portion thereof.

5. The chucking mechanism according to claim 4, wherein
- each of the claw members is made of a resin material by an injection molding, and
- a θ2 which is an angle defined between each of the wall surfaces and a line connecting in the radial direction the central axis and a top end portion of each of the wall surfaces is set in accordance with a draft of the mold.

6. The chucking mechanism according to claim 1, wherein
- the rotor portion includes a cylindrical portion arranged to fit the central opening portion and a top plate portion arranged to cover the cylindrical portion in an axial direction,
- the top plate portion includes at a downward facing surface thereof a downward facing contact surface making contact with a top surface of each of the claw members, and at a radially outer side of the top plate portion an opening hole portion arranged accommodating therein a top surface of each of the claw members,
- a first circumferential width of the tip portion is substantially equal to a second circumferential width defined by a pair of the first claw portions arranged at both circumferential ends of each of the claw members,
- a third circumferential width of a portion of each of the claw members radially inward of the tip portion at the top surface thereof is smaller than the second circumferential width,
- each of the claw members includes an upper side contact portion which makes contact with the downward facing contact surface, and
- the opening hole portion includes at a radially outward portion thereof a wide width portion at which point the opening hole portion is wide circumferentially.

7. The chucking mechanism according to claim 1, wherein
- the rotor portion includes a cylindrical portion arranged to fit the central opening portion and a top plate portion arranged to cover the cylindrical portion in an axial direction,
- the top plate portion includes at a surface thereof facing downwardly a downward facing contact surface making contact with a top surface of each of the claw members, and at a radially outer side of the top plate portion an opening hole portion arranged accommodating therein the top surface,
- the downward facing contact surface is arranged at both circumferential sides of the opening hole portion,
- each of the claw members includes at the top surface thereof a pair of upper side contact portions so as to make contact with corresponding downward facing contact surface, and
- each of the claw members includes the sliding portion at a circumferential portion between the pair of upper side contact portions.

8. The chucking mechanism according to claim 7, wherein the top surface arranged between the pair of upper side contact portions is arranged axially above a bottom surface of the top plate portion.

9. The chucking mechanism according to claim 8, wherein
- a radial space between the upper side contact portion and the tip portion is arranged axially above the upper side contact portion,
- the top surface of each of the claw members is flat in a circumferential direction, and
- the top surface of each of the claw members is arranged continuously with the tip portion.

10. The chucking mechanism according to claim 1, wherein
- the tip portion moves downwardly in an axial direction and inwardly in a radial direction when the disk is set on the chucking mechanism, and
- an axial distance between the tip portion at an axially lowest point and a top surface of the disk mounting portion is greater than approximately 1.1 mm.

11. A motor having the chucking mechanism as set forth in claim 1.

12. A disk driving apparatus having the motor as set forth in claim 11.

13. A chucking mechanism according to claim 1, wherein the sliding portion is located at a second inward and axially downward portion of the tip portion.

14. The chucking mechanism according to claim 13, wherein each of the claw members further includes a second claw portion between the tip portion and the sliding portion.

15. The chucking mechanism according to claim 1, wherein a first circumferential width of the tip portion is substantially equal to a second circumferential width defined by a pair of the first claw portions arranged at both circumferential ends of each of the claw members.

16. The chucking mechanism according to claim 1, wherein a pair of circumferential side surfaces of each of the receiving portions are inclined such that a distance between the side surfaces becomes narrower toward an upper portion thereof,
- wherein θ1 which is an angle defined between the circumferential side surface and a line connecting in a radial direction the central axis and a top portion of the circumferential side surface is smaller than θ2 which is an angle defined between a wall surface and a line connecting in the radial direction the central axis and a top end portion of the wall surface.

17. A chucking mechanism operable to detachably set thereon a discoid disk including a central opening portion, the chucking mechanism comprising:
- a rotor portion including a disk mounting portion concentric with a predetermined central axis and making contact with the disk;

a plurality of claw members, each of the claw members arranged to move in a radial direction and make contact with the central opening portion of the disk to retain the disk;

a plurality of elastic members providing a force in the radial direction to each of the claw members; and a plurality of receiving portions arranged axially opposite to each of the claw members to guide each of the claw members inwardly in the radial direction when each of the claw members is pressured from the central opening portion, wherein each of the claw members includes a plurality of claw portions, each of the claw portions pressuring the central opening portion of the disk outwardly in the radial direction, wherein a sliding portion arranged between the claw portions to make contact with each of the receiving portions, wherein the sliding portion includes a surface inclined in an axial direction with respect to the claw portion, wherein a pair of wall surfaces of each of the claw portions each arranged opposite in a circumferential direction from the sliding portion are inclined such that a distance therebetween becomes narrower toward an upper portion thereof, wherein a pair of circumferential side surfaces of each of the receiving portions are inclined such that a distance between the side surfaces becomes narrower toward an upper portion thereof, wherein $\theta 1$ which is an angle defined between the side surface and a line connecting in a radial direction the central axis and a top portion of the side surface of each of the receiving portions is smaller than $\theta 2$ which is an angle defined between each of the wall surfaces and a line connecting in the radial direction the central axis and a top end portion of each of the wall surfaces.

* * * * *